United States Patent
Kent et al.

(10) Patent No.: US 12,543,016 B2
(45) Date of Patent: Feb. 3, 2026

(54) SYSTEMS AND METHODS FOR FUNCTION BASED VEHICLE GEOFENCING

(71) Applicant: Rivian IP Holdings, LLC, Irvine, CA (US)

(72) Inventors: Ryan Kent, San Mateo, CA (US); Andrew Trevor Belk, Watsonville, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 330 days.

(21) Appl. No.: 18/334,043

(22) Filed: Jun. 13, 2023

(65) Prior Publication Data
US 2024/0323643 A1    Sep. 26, 2024

Related U.S. Application Data

(60) Provisional application No. 63/492,031, filed on Mar. 24, 2023.

(51) Int. Cl.
*H04W 4/021* (2018.01)
*B60R 25/24* (2013.01)

(52) U.S. Cl.
CPC .......... *H04W 4/022* (2013.01); *B60R 25/245* (2013.01)

(58) Field of Classification Search
None
See application file for complete search history.

(56) References Cited

U.S. PATENT DOCUMENTS

| | | | |
|---|---|---|---|
| 2019/0205115 A1* | 7/2019 | Gomes | H04W 4/50 |
| 2019/0272755 A1* | 9/2019 | Giorgi | H04W 4/40 |
| 2022/0046381 A1* | 2/2022 | Ong | H04W 4/022 |
| 2022/0095221 A1* | 3/2022 | McIntyre | H04W 52/0209 |
| 2023/0107449 A1* | 4/2023 | Ong | G08G 1/166 |
| | | | 455/456.1 |
| 2023/0300579 A1* | 9/2023 | Merwaday | B60L 53/67 |
| | | | 701/423 |

OTHER PUBLICATIONS tesla.com, "Air Suspension," retrieved Mar. 24, 2023, from https://www.tesla.com/ownersmanual/models/en_us/GUID-F1B6801A-8946-41AD-8CF9-7A963CDA38E4.html, 4 pgs.
Tesla Owners Online Forum, "Smart Garage Door Opener and Tesla Screen Control," retrieved Mar. 24, 2023, from https://www.teslaownersonline.com/threads/smart-garage-door-opener-and-tesla-screen-control.21312/, 8 pgs.

* cited by examiner

*Primary Examiner* — Adolf Dsouza
(74) *Attorney, Agent, or Firm* — Foley & Lardner LLP

(57) ABSTRACT

A system includes one or more processors, coupled with memory, of a vehicle. The system detects execution of a function of the vehicle. The system identifies, responsive to detection of the execution of the function, a location of the vehicle. The system determines that the location of the vehicle satisfies the geofence. The system can determine that the location satisfies the geofence responsive to execution of the function and based on a comparison of the location of the vehicle with a geofence stored in memory of the vehicle. The system performs an action corresponding to the execution of the function of the vehicle. The system can perform the action responsive to the determination that the location of the vehicle satisfies the geofence stored in memory of the vehicle.

18 Claims, 7 Drawing Sheets

SYSTEMS AND METHODS FOR FUNCTION BASED VEHICLE GEOFENCING

CROSS-REFERENCES TO RELATED APPLICATIONS

This application claims the benefit of priority under 35 U.S.C. § 119 to U.S. Provisional Patent Application No. 63/492,031, filed Mar. 24, 2023, which is hereby incorporated by reference herein in its entirety.

INTRODUCTION

Electric vehicles can receive power from a charger.

SUMMARY

This technical solution is generally directed to systems and methods for function based electric vehicle geofencing. For example, a function can include charging an electric vehicle during a charging session. When the vehicle detects that a function is being executed, the vehicle can determine whether the location of the vehicle satisfies the geofence, and initiate an action that is linked to the function if the geofence is satisfied. Thus, this technical solution can reduce wasted energy, computing, or network resource consumption, by detecting the function, determining whether a geofence is satisfied for the function, and initiating an action that is linked to the function responsive to the determination that the geofence is satisfied.

At least one aspect is directed to a system. The system can include one or more processors of a vehicle, coupled with memory. The one or more processors can detect execution of a function of the vehicle. The one or more processors can identify a location of the vehicle. The identification can be responsive to the detection of the function. The one or more processors can determine that the vehicle satisfies a geofence. The detection can be responsive to execution of the function and based on a comparison of a location of the vehicle with the geofence, stored in memory of the vehicle. The one or more processors can perform an action corresponding to the execution of the function of the vehicle. The action can be responsive to the determination that the vehicle satisfies the geofence stored in memory of the vehicle.

At least one aspect is directed to a method. The method can be performed by one or more processors, coupled with memory, of a vehicle. The method can include the one or more processors detecting execution of a function of the vehicle. The method can include the one or more processors identifying a location of the vehicle. The method can include the one or more processors determining, responsive to execution of the function and based on a comparison of the location of the vehicle with a geofence stored in memory of the vehicle, that the location of the vehicle satisfies the geofence. The method includes the one or more processors performing, responsive to the determination that the location of the vehicle satisfies the geofence stored in memory of the vehicle, an action corresponding to the execution of the function of the vehicle.

At least one aspect is directed to an electric vehicle. The electric vehicle can include one or more processors, coupled with memory. The one or more processors can detect execution of a function of the electric vehicle. The one or more processors can identify location of the electric vehicle. The identification can be responsive to detection of the execution of the function. The one or more processors can determine that the electric vehicle satisfies a geofence. The determination can be responsive to execution of the function and based on a comparison of the location of the electric vehicle with the geofence stored in memory of the electric vehicle. The one or more processors can perform an action corresponding to the execution of the function of the electric vehicle. The function can be responsive to the determination that the location of the electric vehicle satisfies the geofence stored in the memory of the electric vehicle.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
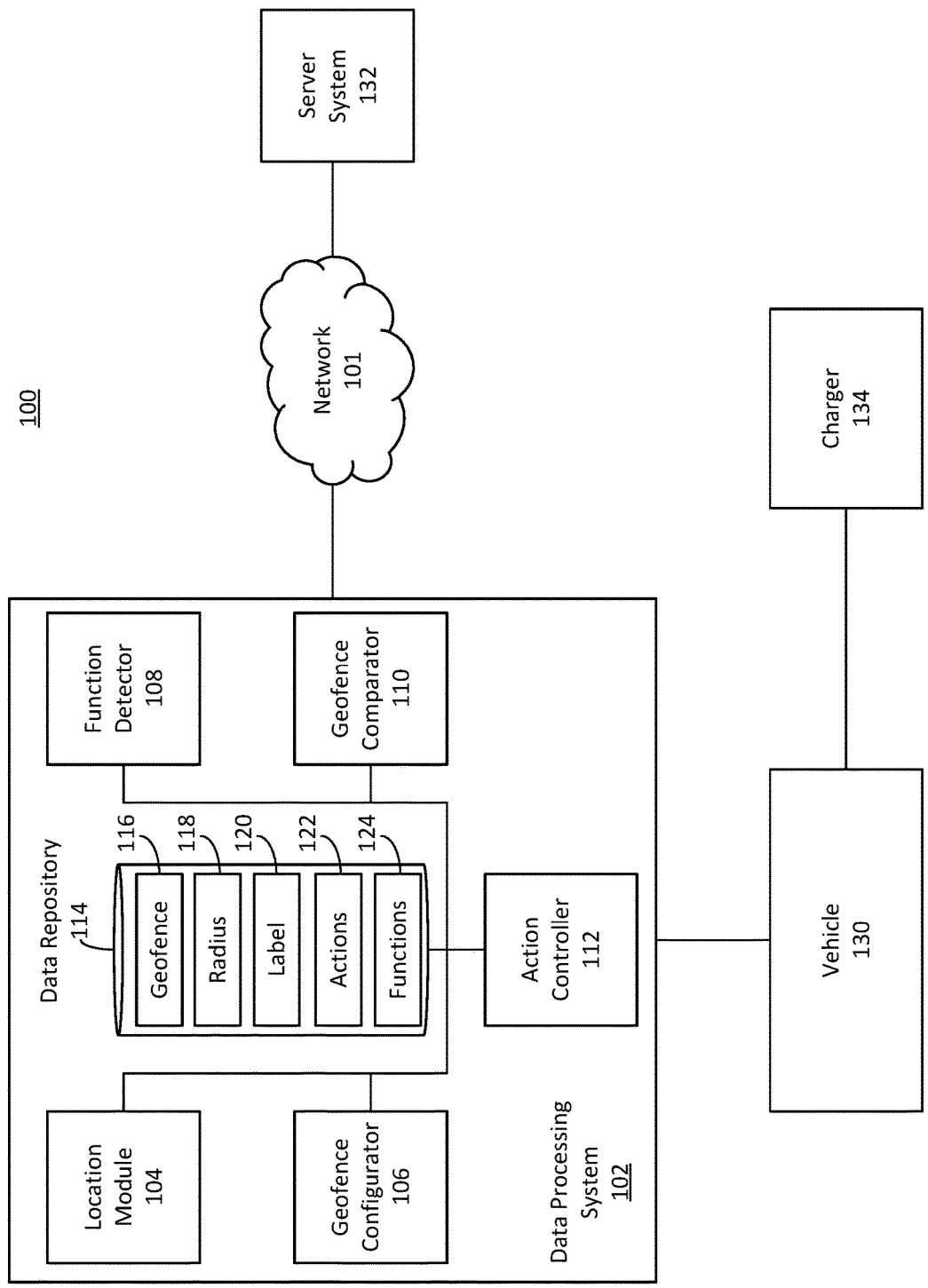
FIG. 1 depicts an example system of function based electric vehicle geofencing.

Following below are more detailed descriptions of various concepts related to, and implementations of, methods, apparatuses, and systems of function based electric vehicle geofencing. The various concepts introduced above and discussed in greater detail below may be implemented in any of numerous ways.

This technical solution is generally directed to systems and methods for function based electric vehicle geofencing. A function can include, for example, charging a vehicle (e.g., a termination or initiation of a charging session), a proximity lock, or an over-the-air software update. A user of the vehicle can assign a label to an address or location, and the vehicle can establish a geofence around the address or location associated with the label. The vehicle can securely store the labeled geofence in memory of the vehicle. When the vehicle detects that a predetermined function is being executed, the vehicle can determine whether the function is being performed within the geofence, and initiate an action that is linked to the function. Thus, this technical solution can reduce wasted energy, computing, or network resource consumption, by detecting the function, determining whether a geofence is satisfied for the function, and initiating an action that is linked to the function responsive to the determination that the geofence is satisfied.

In an illustrative example, the label assigned to a geofence can include or indicate a category for a location. Categories for a location can include, for example, commercial, residential, workplace, government facility, home, or parking garage. The technology can determine an action associated with the function performed at the location, such as automatically locking the vehicle doors, controlling a proximity locking feature, controlling over-the-air software updates, preconditioning the battery, or initiating a predictive charging routine. Actions can include transmitting or receiving data packets over a network or otherwise providing a notification or alert associated with the function that is occurring at the location. The data packets can include an indication associated with a characteristic or attribute of the charging session, such as a demand response associated with a grid providing energy to charge the vehicle, or an indication that the charging session or function occurred within a predetermined category based on the label for the geofence.

The user may wish to perform an action (or disable, modify, or substitute performance of an action) when the location of the vehicle corresponds to a certain category, such as home, work, off-grid cabin, or in long term airport parking. For example, a vehicle can convey a data packet indicative of a location, the data packet including a label for the location of the vehicle, such that an action can be performed based on the labeled location. Thus, the vehicle can locally determine a location, compare it with a geofence for a function or action, and provide an indication (e.g., a Boolean value) indicative of whether the location of the vehicle corresponds to a category, without conveying the actual location of the vehicle.

The disclosed solutions have a technical advantage of facilitating location based actions without sharing an actual location of the vehicle. For example, the vehicle can perform location based actions to charge a vehicle, or control other vehicle states (e.g., locked doors, climate pre-conditioning, or the like). The vehicle can determine whether the location of the vehicle satisfies a geofence having a label. If the geofence is satisfied, the vehicle can transmit a data packet to a server that includes the label associated with the geofence, but without including information about the location of the vehicle or the centroid of the geofence. Such techniques can reduce network loading. For example, a single bit or other reduced length representation can be substituted for location data such as coordinates.

This technical solution can reduce a number of transmissions which can further reduce network congestion, processor loading, and battery usage. For example, the vehicle can determine a location of a vehicle at a first interval (e.g., at least two determinations) and convey an indication of the location of the vehicle at a rate less frequent than the interval. For example, the vehicle can determine a location of the vehicle every minute and convey an indication that the vehicle has remained in a location associated with a performance or non-performance every hour. Such an indication can be employed, by the remote device, to perform a diagnostic check, provide a software update, or determine a delayed charging time for the vehicle.

FIG. 1 depicts an example system 100 of function based electric vehicle geofencing. The system 100 can employ a network 101 to exchange information based on a vehicle location and action 122 corresponding to the execution of the function 124, such as a function 124 of charging the vehicle 130. The system 100 can include, interface with, or otherwise communicate with a data processing system 102. The system 100 can include, interface with, or otherwise communicate with a vehicle 130 such as an electric vehicle 130. The data processing system 102 can be part of, hosted by, or otherwise integrated with a component of the electrical vehicle 130. The system 100 can include, interface with, or otherwise communicate with a vehicle charger 134. The system 100 can include, interface with, or otherwise communicate with a server system 132, via a network 101. The network 101 can include computer networks such as the Internet, local, wide, metro, or other area networks, intranets, cellular networks, satellite networks, and other communication networks such as Bluetooth, or data mobile telephone networks. The network 101 can be public or private. The various elements of the system 100 can communicate over the network 101.

The server system 132 can refer to or include a cloud computing environment with one or more servers. The server system 132 can receive information from the data processing system 102 of the vehicle 130, or provide information to the data processing system 102 of the vehicle 130. For example, the server system 132 can provide over-the-air software updates to the data processing system 102 of the vehicle 130. The server system 132 can facilitate the performance of actions 122 or functions 124 of the vehicle 130. For example, the server system 132 can provide information relevant to a local action 122 taken by the vehicle 130 (e.g., can provide composition of renewable energy in a grid whereupon the vehicle 130 can receive the energy from the charger 134). The server system 132 can receive or store information relevant to a local action 122 taken by the vehicle 130. For example, the server system 132 can receive an indication of a charging speed, time, charge amount, location (e.g., satisfaction of a geofence 116), or efficiency.

The data processing system 102 can include or be part of the vehicle 130. The data processing system 102 can include at least one location module 104. The data processing system 102 can include at least one geofence configurator 106. The data processing system 102 can include at least one function detector 108. The data processing system 102 can include at least one geofence comparator 110. The data processing system 102 can include at least one action controller 112. The data processing system 102 can include at least one data repository 114. The location module 104, geofence configurator 106, function detector 108, geofence comparator 110, or action controller 112 can each include at least one processing unit or other logic device such as a programmable logic array engine, or module configured to communicate with the vehicle data repository 114 or database. The location module 104, geofence configurator 106, function detector 108, geofence comparator 110, or action controller 112 can be separate components, a single component, or part of the vehicle 130. The data processing system 102 can include hardware elements, such as one or more processors, logic devices, or circuits. For example, the data processing system 102 can include one or more components or structures of functionality of computing devices depicted in FIG. 7.

The data repository 114 can include one or more local or distributed databases, and can include a database management system. The data repository 114 can include computer data storage or memory and can store one or more data structures, such as a geofence 116 data structure, radius 118 data structure, label 120 data structure, actions 122 data structure, or functions 124 data structure.

A geofence 116 can refer to or include a virtual geographic boundary. The geofence 116 can be configured to allow the data processing system 102 to trigger a response or action 122 when the vehicle 130 enters or is within the virtual geographic boundary established by the geofence 116. The geofence 116 data structure can include one or more fields or values. The data structure for a geofence 116 can include, for example: {label; centroid_location; radius; function; action}. In another example, the geofence 116 data structure can include: {label; centroid_location}.

The geofence 116 can include one or more regions. For example, a worksite geofence 116 can include multiple sites the user can visit during the course of a workday. Each site can include a boundary. For example, the boundary can be or correspond to a geopolitical boundary (e.g., city, state, province, or so forth). Some boundaries can be defined having various shapes, such as a generally circular boundaries defined according to a radius 118 from a centroid location. For example, a radius 118 can be applied over a projection (e.g., a Mercator projection) or relative to a physical distance from the centroid to define one or more boundaries of a geofence 116.

The radius 118 can be a fixed radius 118, having a predefined distance. The radius 118 can be an adjustable or dynamic radius 118. The dynamic radius 118 can refer to a radius 118 which is based on variable information, such as a function 124 that is detected by the function detector 108. The radius 118 can extend from a centroid location (e.g., grid coordinates, latitude or longitude coordinates, a street address, or a waypoint stored on a memory device of the vehicle 130). The radius 118 can extend from a location entered on a user interface presented or provided by the vehicle 130 or a computing device associated with the vehicle 130, such as the remote server 132. The distance of the radius 118 can define an area of a geofence 116 or a boundary thereof. For example, one or more locations can be bounded by a geofence 116.

The adjustable or dynamic radius 118 can include a radius 118 that changes based on a factor, characteristic, or attribute. For example, the radius 118 can be dynamically selected based on the type of function 124, category or label 120 of the geofence 116, or type of action 122. The radius 118 can be shorter or longer based on the factor, characteristic or attribute. The radius 118 can vary based on time of day, or updates or changes to a program. The radius 118 can vary based on the centroid location. For example, the radius 118 originating from a centroid location within a first geographic location can vary from a radius 118 originating from a centroid location within a first geographic location.

The label 120 can include alphanumeric characters, symbols, colors, or patterns. The label 120 can include a human readable or machine based labels 120. For example, some human readable labels 120 can include (e.g., "work," "garage" "showroom," "campsite," or "trail-head"). Machine based labels 120 can include flag bits in predefined formats corresponding to uses of a vehicle 130 such as to indicate a location corresponding to a production facility, repair facility, overnight parking location of the vehicle 130, or address associated with the vehicle 130 (e.g., a fleet vehicle 130 associated with a registered warehouse). Labels 120 can correspond to physical locations on a 1 to 1 basis, a 1 to N basis, an N to N basis, or an N to 1 basis. For example, numerous locations can include a same label 120 of "public parking." A same location can be associated with "public parking" as "public charger," as in the case of a public charging station located within a parking garage. Various labels 120 can correspond to geofences 116 having various ranks or priorities. For example, different geofences 116 can overlap or correspond to multiple labels 120. For example, a first geofence 116 can correspond to "charger location" and "work." The "charger location" can be prioritized so that an action 122 taken at "work" such as unlocking a cargo compartment, does not conflict with an action 122 taken at a charger location, such as locking a cargo compartment. Ranks or priorities can be determined globally for a label 120, or for each action 122 (e.g., non-conflicting actions 122 of a lower rank or priority label 120 may or may not be executed).

The action 122 can include, for example, transmitting a notification or alert, disabling an operation or feature of the vehicle 130, allowing a function 124 or feature of the vehicle 130, or any other action 122 that facilitates function based geofencing. For example, the action 122 can include conveying a battery state of charge, an amount of energy delivered to a battery, or a location (e.g., a label 120 corresponding to a location). The action 122 can refer to setting or adjusting a mode of the vehicle 130 (e.g., charging rate). The functions 124 can refer to or include charging the vehicle 130, proximity locking, or performing or over-the-air software updates. Performing or over-the-air software updates can include, for example, downloading, verifying, installing, or executing over-the-air software updates. Some actions 122 can be or include a conveyance of information. For example, an action 122 can be or include providing an indication to the remote server 132 that the vehicle 130 satisfies a geofence 116. Such a conveyance can omit location information, such that the remote server 132 can receive an indication of a label 120 for a vehicle location, without receiving a corresponding geographic location.

The data processing system 102 can include at least one location module 104 designed, constructed, or operational to determine a location of the vehicle 130. For example, the location module 104 can determine a location periodically, or responsive to a condition or an event, such as in response to a detection of an execution of a function 124. For example, the location module 104 can receive a message or other indication from the function detector 108, indicative of a function 124. Responsive to receiving an indication of a detection of the function 124, the location module 104 can determine, register, retrieve, or store a current location. The location module 104 can determine a maintenance or change in position over time (e.g., a speed or relocation). For example, the location module 104 can record a location of a vehicle 130 incident to a charging session or other function 124 (e.g., at an initiation and completion of the session or periodically during the charging session).

The location module 104 can determine an indication of a location change during the charging session. For example, the location module 104 can compare each location to a geofence 116 and determine that no location change occurred during charging based on the presence of each location within a geofence 116 (e.g., a geofence 116 corresponding to a label 120). The location module 104 can compare differences in location to a change threshold, such that an expected variation in a detected location (e.g., less than 50 meters, 100 meters, or so forth) can indicate no location change. A change threshold can vary according to a preference, received via a user interface (e.g., vehicles 130 at a "campsite" labeled location can remain at the location when moving between a tent location and a boat launch). A change threshold can vary according to a detection accuracy. For example, a location adjacent to a cliff face or in an urban environment can correspond to a geofence 116 which includes measurement errors due to, for example, multipath error in global navigation satellite systems (GNSS) such as the Global Positioning System (GPS) and can thus be larger than another location.

The location module 104 can include one or more sensors to determine a location of the vehicle 130. Sensors can include, for example, a GPS sensor. The location module 104 can determine a location based on a triangulation to one or more devices such as GPS satellites, cellular towers, or other wireless connections. The location module 104 can include a cellular device or wireless networking device. The location module 104 can determine a location based on a proximity to a wired or wireless device. For example, the location model can determine a location based on a connection to a Wi-Fi device, according to a signal strength or a network type (e.g., a 5 GHz network can provide greater accuracy than a 2.4 GHz network based on a lesser range of the 5 GHz network).

The location module 104 can determine a location, or a persistence of a location based on an identifier of a connected device. For example, the location module 104 can receive a service set identifier (SSID) or other indication of an identity of a network or network connected device. The location module 104 can associate the SSID or other identifier with a labeled location. The SSID can be a connected SSID or another SSID which is associated with (e.g., proximal to) the labeled location. A user interface may receive the indication of association, or the location module 104 can determine a coincidence of the locations based on a frequency of coincidence (e.g., incidence of the vehicle being at a labeled location when receiving an SSID or other identifier which is greater than a predetermined threshold, such as 95% or 99%).

The location module 104 can determine a location from one or more sources. For example, the location module 104 can determine a connection to a network with an SSID or other identifier, and a location indicated by a GNSS receiver, among other techniques. The location module 104 can arbitrate therebetween to, for example, improve rejection of spurious location data. For example, in the case of a spurious GPS signal, the location module 104 can determine a connection or presence of an SSID was detected at one or more points in time (e.g., a beginning or ending of a charging session; proximal to or during the receipt of the spurious measurement), and indicate that the spurious GPS signal is invalid. The location module 104 can determine the vehicle did not move during the charging session based on the rejection of the spurious GPS data.

The location module 104 can substitute GNSS data for other network identifier data to, for example, reduce energy usage. For example, the location module 104 may substitute an indication of a network or device identity from a WiFi, Bluetooth, or other network which may reduce or eliminate a power-on time of a GNSS or other antenna, reducing power use.

The location module 104 can include an inertial measurement unit, accelerometer, or gyroscope. The location module 104 can determine the location based on dead reckoning from a previously determined location according to an accelerometer or other vehicle data (e.g., odometer). For example, the vehicle 130 can determine a location has changed not since a previous measurement. The location can include a degree of uncertainty, such as a confidence or accuracy of the determined location. The location can include various location data types such as a latitude and longitude, street address, or a distance from a predefined location. The location module 104 can determine a location based on a wired connection, such as a wired connection to a charger 134 associated with a label 120 or other location information, or a diagnostic connection to a vehicle 130 associated with a location (e.g., service facility or factory). The location module 104 can receive an indication from a vehicle control system that the vehicle 130 has not moved. For example, a vehicle 130 in a standby or off state can provide an indication that the vehicle 130 has not moved since a previous measurement.

The location module 104 can determine a location in a first location type based on a location from a second location type. For example, the location module 104 can determine a latitude and longitude corresponding to a street address, or a street address corresponding to a latitude and longitude. The location module 104 can generate less precise location data from more precise location data. The less precise location can be a same or different location type as the more precise location data. For example, the less precise data can be latitude and longitudinal data generated by truncating trailing digits of latitude and longitudinal data (such as truncating seconds, minutes or a digit thereof), by generating a random location within a predefined distance from the precise location (e.g., generating a precise location within a mile of the measured location), or so forth. Such a generation can be rate-limited to prevent determination of a precise location from an aggregation of imprecise location data. In another example, the location module 104 can generate a street address from latitude and longitudinal data, whereupon a portion of the address can be randomized or truncated (e.g., by randomizing or truncating a street address, or omitting information other than a zip code, city, state, or so forth for less precise data).

The data processing system 102 can include at least one geofence configurator 106 designed, constructed, or operational to create, generate, establish, maintain, or otherwise provide a geofence 116. The geofence configurator 106 can provide a user interface, such as a graphical user interface or an audio-based user interface. The user interface can include, interface with, or otherwise utilize a touchscreen, keyboard, buttons, knobs, other user interface input devices 730 or display 735 depicted in FIG. 7, for example. The user interface can include a mobile or other application in network communication with the vehicle 130 (e.g., Bluetooth connection, WiFi, or so forth). For example, the user interface can be presented to an occupant of the vehicle 130 or a user of a mobile or other computing device associated with the vehicle 130.

Through the user interface, the geofence configurator 106 can provide one or more prompts for input, and receive input. For example, the geofence configurator 106 can provide a graphical user interface with an indication of a location. The location can be the location determined by the location module 104, an address input via the user interface by the user, or an address or location selected by the user from an electronic map presented via the graphical user interface of the geofence configurator 106. The geofence configurator 106 can receive a location from the server system 132, and present the location, via the user interface, for selection, confirmation, or modification.

The geofence configurator 106 can prompt the user to assign a label 120 for the location or geofence 116. The geofence configurator 106 can provide a predetermined list of labels 120 or categories that are available for selection. In some cases, the user can type a custom label 120. Predetermined or custom labels 120 can corresponds to, or include, categories such as commercial, residential, work, home, eligible location, ineligible location, authorized, or unauthorized (e.g., with respect for a particular key fob, such as a valet key). The geofence configurator 106 can receive, via the user interface, the label 120 for the geofence 116. The geofence configurator 106 can assign the label 120 to the geofence 116. The geofence configurator 106 can link the geofence 116 with an action 122 such that satisfaction of the geofence 116 causes the data processing system 102 to execute or initiate the corresponding action 122.

The geofence configurator 106 can establish a radius 118 for the geofence 116. The radius 118 can be a fixed radius 118 or a dynamic radius 118. The geofence configurator 106 can establish a centroid location or distance of the radius 118 based on the location of the vehicle 130. The geofence configurator 106 can establish the radius 118 upon the detected the execution of the function 124 by the data processing system 102. For example, upon locking, exiting, or charging the vehicle 130, the geofence configurator can detect whether one or more geofences 116 is satisfied. The geofence configurator 106 can establish the radius 118 based on the location and the type of the function 124. For example, locking, alternating current (AC) charging, direct current (DC) charging, or shutting down a vehicle 130 can be associated with varying radii 118. The geofence configurator can 106 store, maintain, or access a data repository 114 storing one or more radii 118 from which to select a radius 118 based on the function 124 for the geofence 116. For example, each of a set of radii 118 can correspond to each of a set of locations, such as geographic locations such as cities or states or location labels 120.

The geofence configurator 106 can store the geofence 116 in the data repository 114. The geofence configurator 106 can securely share the geofence 116, such as with other components of the data processing system 102. The geofence configurator 106 can use one or encryption or cryptographic techniques to store the geofence 116 in the data repository 114 of the vehicle 130. The geofence configurator 106 can store and maintain the geofence 116 in memory of the data processing system 102 such that the geofence 116 is not transmitted or provided to a device separate or remote from the data processing system 102 of the vehicle 130. For example, the location information associated with a geofence 116 can be inaccessible to the server system 132. The geofence configurator 106 can store the geofence 116 according to a same data storage type as location data generated by the location module 104 (e.g., a same access level, encryption type, data or retention interval).

The data processing system 102 can include at least one function detector 108 designed, constructed, or operational to detect an execution of a function 124 of the vehicle 130. For example, the vehicle function 124 can include locking the vehicle 130 or unlocking the vehicle 130, connecting the vehicle 130 to a charger 134, receiving energy from the charger 134 (e.g., at a charging speed exceeding a threshold), achieving a state of charge relative to a threshold (e.g., a predefined threshold or a previous state of charge of the battery prior to a connection of the charger 134 or receiving the energy), employing the vehicle 130 in a vehicle to grid (V2G) mode, removing a key fob from a sensor range of the vehicle 130, or exceeding a predefined speed or acceleration (e.g., an acceleration indicative of a collision). A vehicle function 124 can include a combination or other logical aggregation of other vehicle functions 124. For example, a function 124 can be detected when the vehicle 130 exceeds a predefined acceleration when the vehicle 130 is locked (e.g., when the vehicle 130 is jostled or collided with), or when the vehicle 130 exceeds a predefined speed and is not in communication with a particular key fob or mobile device (e.g., when an authorized user is not in the vehicle 130).

The function detector 108 can detect the function 124 or the ongoing performance of the function 124. For example, the function detector 108 can detect when a charge plug of the charger 134 is connected to the vehicle 130. The function detector 108 can detect when charging begins. The function detector 108 can detect when charging completes or is otherwise terminated, and the charge plug is removed from the vehicle 130. The function detector 108 can detect a rate of charge, or otherwise determine an amount of energy delivered to the battery within a time interval.

The function of the vehicle 130 can be or include a function 124 comprising or initiated by network communication. For example, a vehicle function 124 can include a receipt of an availability for a software update. A further vehicle function 124 can include downloading the software update, installing the software update, restarting a controller or portion thereof to execute instructions included in the update, validating the software update, and removing backups or other installation files of an installation package.

Responsive to detecting the function 124, the function detector 108 can provide a prompt or alert to the location module 104 to cause the location module 104 to determine an actual or current location of the vehicle 130. The location module 104 can detect the location of the vehicle 130 responsive to detection of the execution of the function 124 by the function detector 108. The location module 104 can provide the detected location of the vehicle 130 to the geofence comparator 110 to determine if the location of the vehicle 130 satisfies a geofence 116 stored in memory of the data processing system 102, and configured by the geofence configurator 106. For example, the location module 104 can determine that the vehicle 130 satisfied the geofence 116 for a time duration, such as a time duration corresponding to charging the vehicle 130.

The data processing system 102 can include at least one geofence comparator 110 designed, constructed, or operational to compare a location of a vehicle 130 to a geofence 116 for the vehicle 130. The geofence comparator 110 can access a geofence 116 from a memory of the vehicle 130 (e.g., data repository 114). The geofence comparator 110 can employ a comparison to determine whether a geofence 116 is satisfied. The satisfaction of the geofence 116 can correspond to a location of the vehicle 130 within one or more areas bounded by the geofence 116. The geofence comparator 110 can determine that a geofence 116 is satisfied if the location of the vehicle 130 is within the geofence 116. For example, for a geofence 116 defined according to a centroid location and radius 118, the geofence comparator 110 can determine a distance to the centroid location, and compare the distance to the radius 118 to determine if the vehicle 130 is within the geofence 116 based on a distance which is less than or equal to the radius.

The geofence comparator 110 can determine whether one or more geofences 116 are satisfied, or compare the location of the vehicle 130 with multiple geofences 116 stored in the data repository 114 to determine which of the one or more geofences 116 are satisfied. For example, a first geofence 116 can have a first label 120, and a second geofence 116 can have a second label 120. The geofence comparator 110 can determine that the location of the vehicle 130 satisfies the first geofence 116 with the first label 120, but not the second geofence 116 with the second label 120. In some cases, the geofence comparator 110 can determine that multiple geofences 116 are satisfied by the location. If multiple geofences 116 are satisfied by the location, the geofence comparator 110 can select a higher ranking or prioritized geofence 116, or provide an indication to the server system 132 that both geofences 116 are satisfied.

The geofence comparator 110 can determine a level of confidence associated with a satisfaction for a geofence 116. The level of confidence can be based on one or more location measurements. For example, a level of confidence can increase with an increased number of measurements, or an increased number of data sources. For example, temporally longitudinal measurements from a GNSS sensor can increase a confidence over time, or a combination of cellular tower, GNSS, and WiFi data can increase a confidence of a location. The geofence comparator 110 can determine a geofence 116 is satisfied based on a comparison of a confidence level to a confidence threshold.

The data processing system 102 can include at least one action controller 112 designed, constructed, or operational to perform an action 122. For example, the action 122 can include disabling a proximity locking feature, disabling or enabling over-the-air updates, an electrical action 122 such as adjusting a charging time or rate, or a communicative action 122 such as generating a notification indicative of the state of the vehicle 130 (e.g., a charging thereof). The notification can include a charging rate, estimated charging time, charging type (e.g., fast charging, level 1 charging, or so forth).

The action controller 112 can receive a message from the geofence comparator 110 indicating that the vehicle 130 (e.g., a location thereof) satisfies the geofence 116 stored in the memory of the vehicle 130. Responsive to such a message, the action controller 112 can perform an action 122 corresponding to the execution of a function 124 of the vehicle 130. The action controller 112 can perform an action 122 responsive to a combination of conditions. For example, the action controller 112 can provide an indication of a charging session which is completed at a labeled location. For example, the action controller 112 can convey an indication amount of energy delivered to a battery at a labeled location for one or more labeled locations, and omit an indication of the amount of energy delivered from one or more other labeled locations.

The action controller 112 can select the action 122 to perform based on a label 120. Thus, even where the action 122 includes network communication, corresponding network devices may not be aware of a particular location associated with the label 120. For example, the vehicle 130 can locally determine an action 122 based on a label 120, and provide a data packet to the remote server. The action controller 112 can be configured to transmit a predetermined data packet to the server system 132. The data packet may not include any location information. Rather, the data packet can indicate the label 120 corresponding to the geofence 116 that the data processing system 102 determined to be satisfied. For example, the action controller 112 can only transmit the label 120 associated with the satisfied geofence 116, without transmitting any other location information, thereby reducing the file size of the data packet or reliability of the information. The action controller 112 can be configured to omit a label 120. For example, an action 122 which is performed for a user's "cabin" and "secured work garage" can generate a data packet which does not discriminate between the labels 120, such that the server system 132 can store data or generate a response to the network communication (e.g., to push a software update) without receipt of the associated label 120.

In an illustrative example, where the function 124 corresponds to a charging session for the vehicle 130, the data processing system 102 can identify the location of the vehicle 130 responsive to delivery of power via a power cable of a charger 134 to determine that the vehicle 130 satisfies the geofence 116 at the beginning of the charging session. The data processing system 102 can identify a second location of the vehicle 130 responsive to termination of the delivery of power via the power cable of the charger 134. The data processing system 102 can determine that the second location satisfies the geofence 116. The data processing system 102 can select the action 122 to perform based on satisfaction of the geofence 116 by both the location and the second location. For example, if the first and second location are at a location supporting V2G, the remote server can provide supply or demand information to the electric vehicle 130, based on the state of charge. The V2G charging can be enabled based on a location label 120, such as home, work, long term airport parking, or highway charging station.

In some cases, the function 124 can correspond to a proximity locking function 124 of the vehicle 130. If the vehicle 130 is within the geofence 116, the data processing system 102 can perform an action 122 that includes disabling the proximity locking function 124. By disabling the proximity locking function 124 at a desired location, such as a garage of a user's home, the vehicle 130 can leave the doors in a state (e.g., locked or unlocked) regardless of whether the physical or digital key is proximate to the vehicle 130, thereby saving energy resource consumption as well as reducing mechanical movements on the vehicle 130 which can extend service intervals.

In some cases, the function 124 can correspond to a software update of the vehicle 130. The data processing system 102 can perform an action 122 to authorize the software update based on the vehicle 130 being within, or satisfying, the geofence 116. For example, the data processing system 102 can respond to a pushed software update with an acknowledgement, install the update, reset a controller thereof, or provide an indication of a successful install to a new revision or a fall back to a previously installed version.

The data processing system 102 can detect a second execution of the function 124 of the vehicle 130. The data processing system 102 can identify, responsive to detection of the second execution of the function 124, a second location of the vehicle 130 different from the location that was detected at the execution of the first function 124. The data processing system 102 can determine that the second location of the vehicle 130 is outside the geofence 116. The data processing system 102 can perform, responsive to the determination that the second location of the vehicle 130 is outside the geofence 116 stored in memory of the vehicle 130, a second action 122 corresponding to the execution of the function 124 of the vehicle 130. The second action 122 can be different from a first action 122 that was performed. The second action 122 include conveying different information, or omitting a transmission of information. For example, the second action 122 can include clearing a stored message prior to transmission or storing a local indication of the difference between the first location and the second location.

Figure 2:
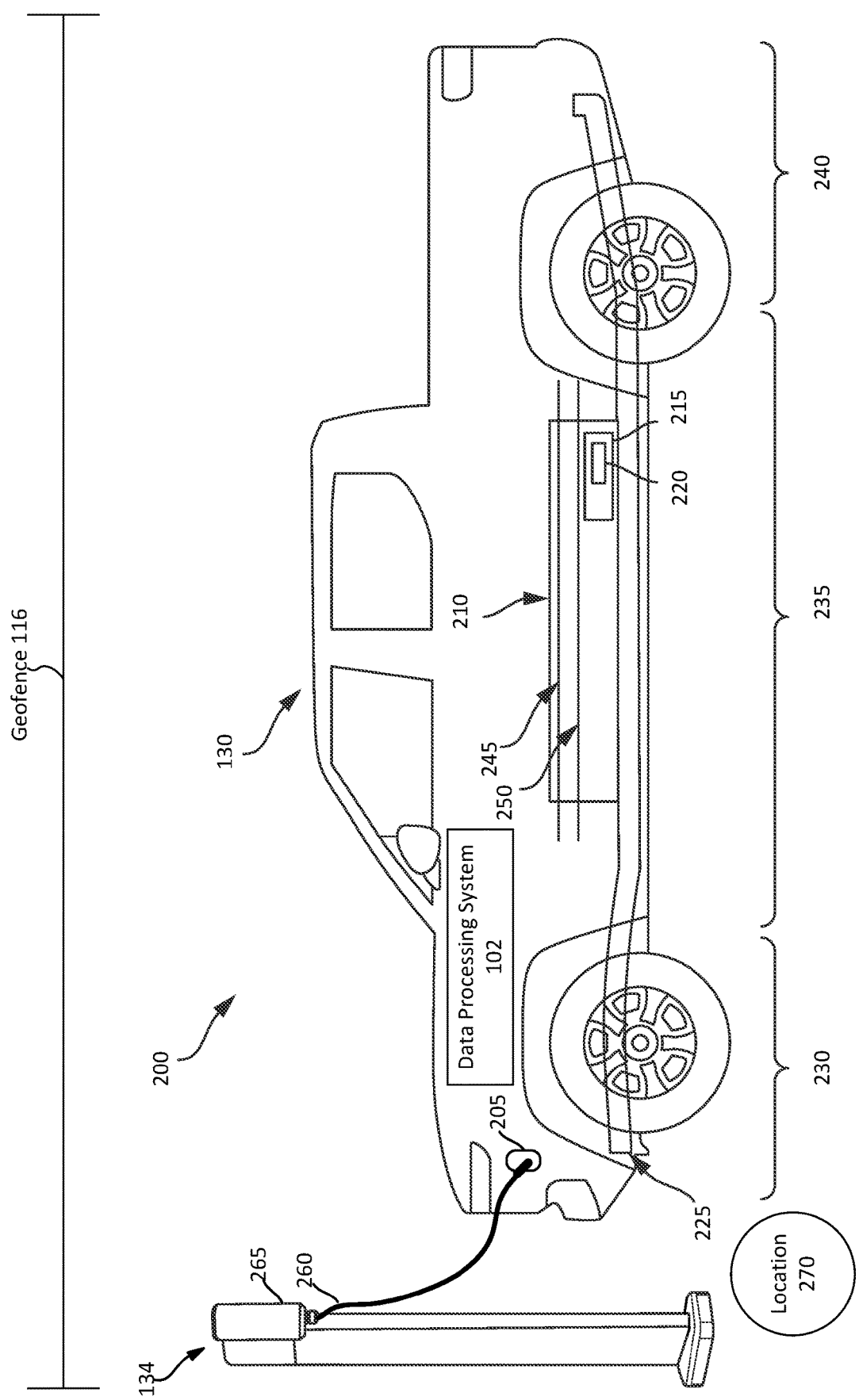
FIG. 2 depicts an example electric vehicle.

FIG. 2 depicts an example cross-sectional view 200 of an electric vehicle 130 installed with at least one battery pack 210. Electric vehicles 130 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 210 can also be used as an energy storage system to power a building, such as a residential home or commercial building. Electric vehicles 130 can be fully electric or partially electric (e.g., plug-in hybrid) and further, electric vehicles 130 can be fully autonomous, partially autonomous, or unmanned. Electric vehicles 130 can also be human operated or non-autonomous. Electric vehicles 130 such as electric trucks or automobiles can include on-board battery packs 210, batteries 215 or battery modules 215, or battery cells 220 to power the electric vehicles. The electric vehicle 130 can include a chassis 225 (e.g., a frame, internal frame, or support structure). The chassis 225 can support various components of the electric vehicle 130. The chassis 225 can span a front portion 230 (e.g., a hood or bonnet portion), a body portion 235, and a rear portion 240 (e.g., a trunk, payload, or boot portion) of the electric vehicle 130. The battery pack 210 can be installed or placed within the electric vehicle 130. For example, the battery pack 210 can be installed on the chassis 225 of the electric vehicle 130 within one or more of the front portion 230, the body portion 235, or the rear portion 240. The battery pack 210 can include or connect with at least one busbar, e.g., a current collector element. For example, the first busbar 245 and the second busbar 250 can include electrically conductive material to connect or otherwise electrically couple the battery 215, the battery modules 215, or the battery cells 220 with other electrical components of the electric vehicle 130 to provide electrical power to various systems or components of the electric vehicle 130.

The electric vehicle 130 can include a charging port 205 to electrically couple with the charger 134. The charging port 205 can include or interface with a presence detection circuit. For example, a pull-up or pull-down resistor, a digital communication line, or a mechanical detent can be actuated by the interface of the charger 134 with the electric vehicle 130 at the charging port 205. The vehicle 130 can include a data processing system 102 which can receive an indication of a presence of a charging cable from the presence detection circuit.

The vehicle charger 134 can be located at a location 270. The location 270 can be disposed within one or more geofences 116 associated with one or more labels 120. The vehicle charger 134 can provide power to the vehicle 130 via at least one cable 260. The cable 260 can mechanically or electrically couple with the vehicle 130. The cable 260 can be contained or at least partially contained, stored, or housed within the dispenser 265. The cable 260 can be a harness, conductor, connector, at least one wire, bus bar, inductive coil, or other component that can provide the power to the vehicle 130. The cable 260 can be any gauge, strain, or ampacity. The cable 260 can contain any number of conductors. The cable 260 can be shielded. The cable 260 can have any type of insulation, such as polytetrafluoroethylene (PTFE), polyvinyl chloride (PVC), or polyethylene (PV). The cable 260 can be wound, spooled, folded, or pleated for storage within the dispenser 265. The cable 260 can transmit at least power or signals.

The vehicle charger 134 (e.g. "charger 134") can include a plug or other device coupled with the cable 260 that makes electrical connections with the charge port 205 of the vehicle 130. The charge port 205 and the cable 260 can make at least one positive, negative, ground, or data communication connection with a vehicle 130 between the vehicle charger 134 and the vehicle 130 or a battery pack 210, batteries 215 or battery modules 215, or battery cells 220. The cable 260 can convey power between the vehicle 130 and the charger 134 (e.g., the charger 134 can deliver power to the vehicle 130, or the vehicle 130 can deliver power to the charger 134). The transfer of energy can correspond upon communication received from a server system 132, such as a demand for energy, price information, or authorization. The charger 134 can convey energy via the cable 260 and the charge port 205 to the vehicle 130 to charge the battery pack 210, batteries 215 or battery modules 215, or battery cells 220. The charger 134 can be powered by at least an external battery bank, an electric grid system, or distributed generation (such as photovoltaics on the charger 134). The vehicle charger 134 can include the dispenser 265. The vehicle charger 134 can be ground-mounted, overhead mounted, mobile, or wall-mounted.

The data processing system 102 of the vehicle 130 can determine, responsive to detecting that the charging cable 260 is connected to the charge port 205 of the vehicle 130, that a function 124 (e.g., charging) has been initiated. For example, the data processing system 102 can detect a coupling of the cable 260, or receipt of power therefrom, or a change to the state of charge of the battery pack 210. The data processing system 102 can determine that the location 270 of the vehicle 130 is within the geofence 116, and determine a label 120 corresponding to the geofence 116. The data processing system 102 can determine a location during a time period corresponding to a charging session based on a continual connection to the charger 134. For example, at a conclusion of a charging session, the data processing system 102 can determine that the location of the vehicle 130 is within a geofence 116, and that the vehicle 130 has remained connected to the charger 134 during the charging session. Based on the location and continual connection, the data processing system 102 can determine that the vehicle 130 was located in the geofence 116 during a time period corresponding to a connection to the charger 134, a provision of energy thereto, or a receipt of energy therefrom.

Figure 3:
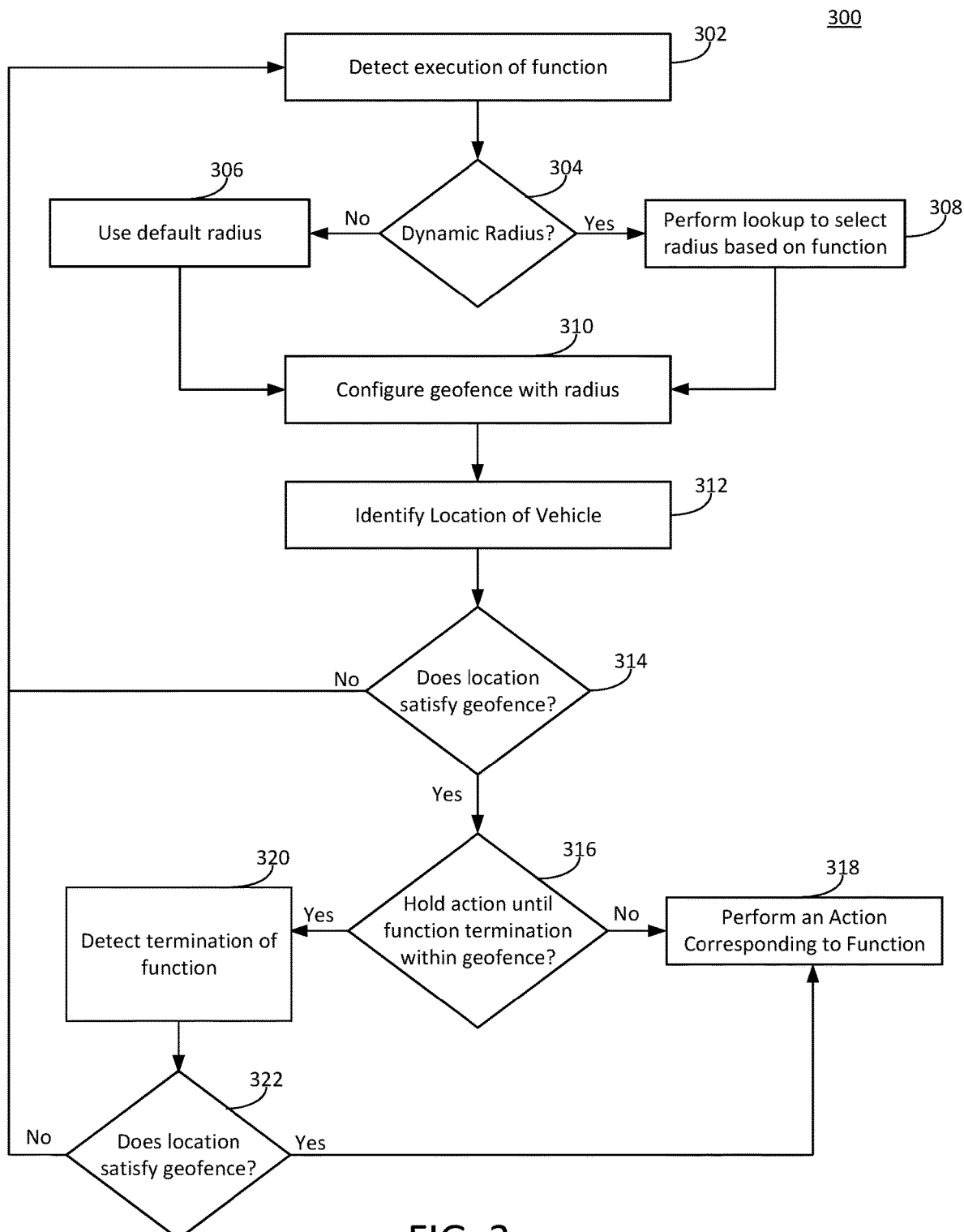
FIG. 3 depicts an example flow diagram of a method for function based electric vehicle geofencing.

FIG. 3 depicts an example flow diagram of a method for function based electric vehicle geofencing. The method 300 can be performed by one or more systems or components depicted in FIG. 1, FIG. 2 or FIG. 7, including, for example, a data processing system 102 or vehicle 130. At ACT 302, the data processing system 102 of a vehicle 130 can detect execution of a function. For example, an execution of a function 124 can include a state of a charging state of the vehicle 130, which the data processing system 102 can detect according to a presence of a charging cable, an amount of energy provided to a battery, received from a charger 134, a net change in energy stored in the battery, or the like. The function 124 can depend on a location of a vehicle 130. For example, the data processing system 102 can detect a first function 124 for charging at a location bounded by a first geofence 116 and a second function 124 for charging at a location bounded by a second geofence 116 (e.g., respective locations can correspond to a public or residential charger 134). The data processing system 102 can detect a function 124 based on a charging speed or type (e.g., DC charging, AC charging, level 1 charging, or level 2 charging).

At decision block 304, the data processing system 102 can determine whether to select, set, or use a dynamic radius 118 or a default radius 118 that is fixed. If the data processing system 102 determines to use a default radius 118, then the data processing system 102 can proceed to ACT 306. If the data processing system 102 determines to use a dynamic radius 118 at decision block 304, then the data processing system 102 can proceed to ACT 308. The data processing system 102 can determine whether to use a default or dynamic radius 118 based on one or more of the type of function detected at ACT 302 or the location of the vehicle 130. For example, the data processing system 102 can determine a location, and compare the location to one or more first geofences 116 (e.g., geofences 116 corresponding to one or more state or other municipal boundaries, an urban boundary, or along a route). Responsive to the first geofence 116, the data processing system 102 can determine a radius 118. For example, the radius 118 can vary between states, between rural and urban areas, or between an interstate route and surface streets. The data processing system 102 can determine whether to employ a dynamic radius 118 based on communication with the server system 132. For example, the data processing system 102 can provide information to the server system 132 and receive a response thereto, or can receive an update for a table, such as a look up table which is selected from at ACT 308.

At ACT 306, the data processing system 102 can retrieve a default radius 118. For example, the default radius 118 can be a radius 118 previously associated with a vehicle 130 or user. The default radius 118 can include a radius 118 stored locally on a memory of the data processing system 102. For example, the data processing system 102 can request a radius 118 from the server system 132 and select the default radius 118 responsive to a response from the server system 132 indicative of an employment of the default radius 118, or a non-response (e.g., after a predetermined amount of time without receiving a response, or responsive to a failure to connect to the remote server).

At ACT 308, the data processing system 102 can perform a lookup in a data repository 114 to select a radius 118 based on the type of function detected at ACT 302. For example, the data processing system 102 can determine a radius 118 corresponding to a first geofence 116. A radius 118 can vary according to a satisfaction of a geofence 116 (e.g., a different geofence 116 relative to decision block 314). For example, a geofence 116 in a rural area or along an interstate can correspond to a different radius 118 than for an urban center or along a surface street. A radius 118 can vary according to a vehicle type or identity, user preference, function 124, or so forth. For example, a radius 118 corresponding to charging or receiving a software update can be different from a radius 118 corresponding to a speed which exceeds a threshold. A radius 118 can vary according to a municipal boundary or other location. For example, urban centers can be associated with larger radii 118 (e.g., to account for loss of accuracy of GPS sensors), or smaller radii 118 (e.g., to granulize actions 122 to dense locations). Thus, a same location label 120 may be associated with different radii 118 according to a satisfaction of a geofence. For example, a location can be provided with high precision (e.g., to determine that the vehicle is located proximal to a charger in a parking garage), and low specificity (e.g., the label 120 may not discriminate between the particular charger, and potentially thousands of other chargers).

From either ACT 306 or ACT 308, the data processing system 102 can proceed to ACT 310 to configure a geofence 116 with a radius 118. For example, the configuration of the geofence 116 can define an area bounded by a radial distance from a centroid. The illustrative examples of radially defined geofences 116 are not intended to be limiting, geofences 116 can be defined based on a travel time, or along other boundaries (e.g., squares, along a municipal boundary, or so forth). AT ACT 312, the data processing system 102 can identify a location of the vehicle 130. For example, the location module 104 can determine a location such as an address, intersection, longitude/latitude, map tile with a unique identifier, reference point, or other indication of a location. The location can include a range of potential locations, confidence interval associated with a location, or the like.

At decision block 314, the data processing system 102 can determine whether the location identified for the vehicle satisfies the geofence 116 configured with the radius 118 at ACT 310. The satisfaction of the geofence 116 can be determined by determining that a location is within a geofence 116, or that a range of locations intersects with or is bounded by the geofence 116. If the location satisfies the geofence 116, the data processing system 102 can proceed to decision block 316. If, however, the location does not satisfy the geofence 116 at decision block 314, then the data processing system 102 can return to ACT 302 to monitor for execution of function 124.

At decision block 316, the data processing system 102 can determine whether to hold the action 122 until the function 124 has terminated within the geofence 116. For example, for a charging session, the data processing system 102 can be configured to not perform the corresponding action 122 until the data processing system 102 can confirm that the geofence 116 is satisfied both at the beginning of the charging session, and also at the termination or completion of the charging session. If the data processing system 102 determines to not hold the action 122 until confirming whether the geofence 116 is satisfied at the termination of the function 124, where the function 124 includes a session or multiple acts that occur over a time interval greater than a threshold (e.g., 2 minutes, 3 minutes, 5 minutes, 10 minutes, or more), then the data processing system 102 can proceed to ACT 318 to perform the action 122 corresponding to the function 124. If, however, the data processing system 102 determines to hold the action 122 at decision block 316, then the data processing system 102 can proceed to ACT 320.

At ACT 320, the data processing system 102 can wait until the detection that that the function 124 has terminated. Upon detection of such termination, the data processing system 102 can proceed to decision block 322 to determine whether the location satisfies the geofence 116. For example, the satisfaction of the geofence 116 can be determined based on a location (or one of a range of locations) that satisfies a geofence 116. If the data processing system 102 determines that the location satisfies the geofence 116 at decision block 322, the data processing system 102 can proceed to ACT 318 to perform the action 122 corresponding to the function 124. For example, the action 122 can include a conveyance of information wherein the action 122 can comprise transmitting a data packet indicative of a label 120 associated with the geofence 116, or information associated with the label 120. Such information can include information associated with a charging session such as an amount of energy delivered or stored in a battery, a charging time, or a state of charge of the battery. If, however, the data processing system 102 determines at decision block 322 that the location does not satisfy the geofence 116 when the function terminates, the data processing system 102 can determine to not perform the action 122 (or otherwise block or prevent the action 122 from being performed). The data processing system 102 can return to ACT 302 to wait to detect execution of a function 124.

Figure 4:
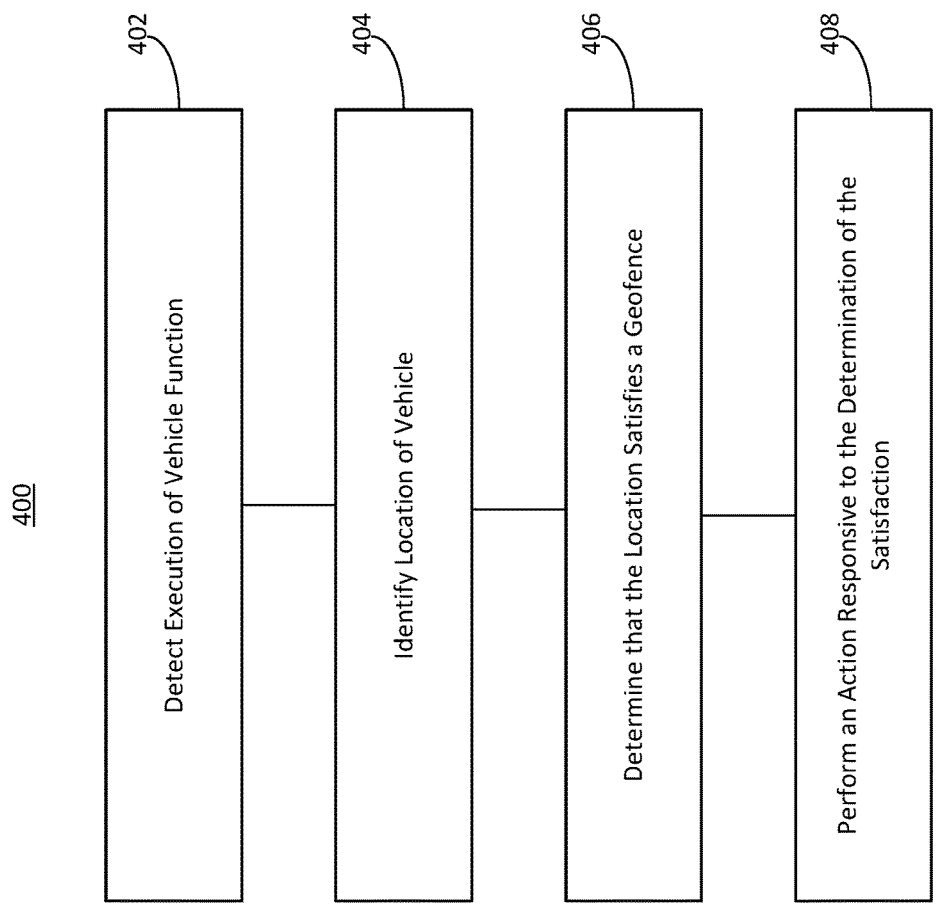
FIG. 4 depicts an example flow diagram of a method for function based electric vehicle geofencing.
Figure 7:
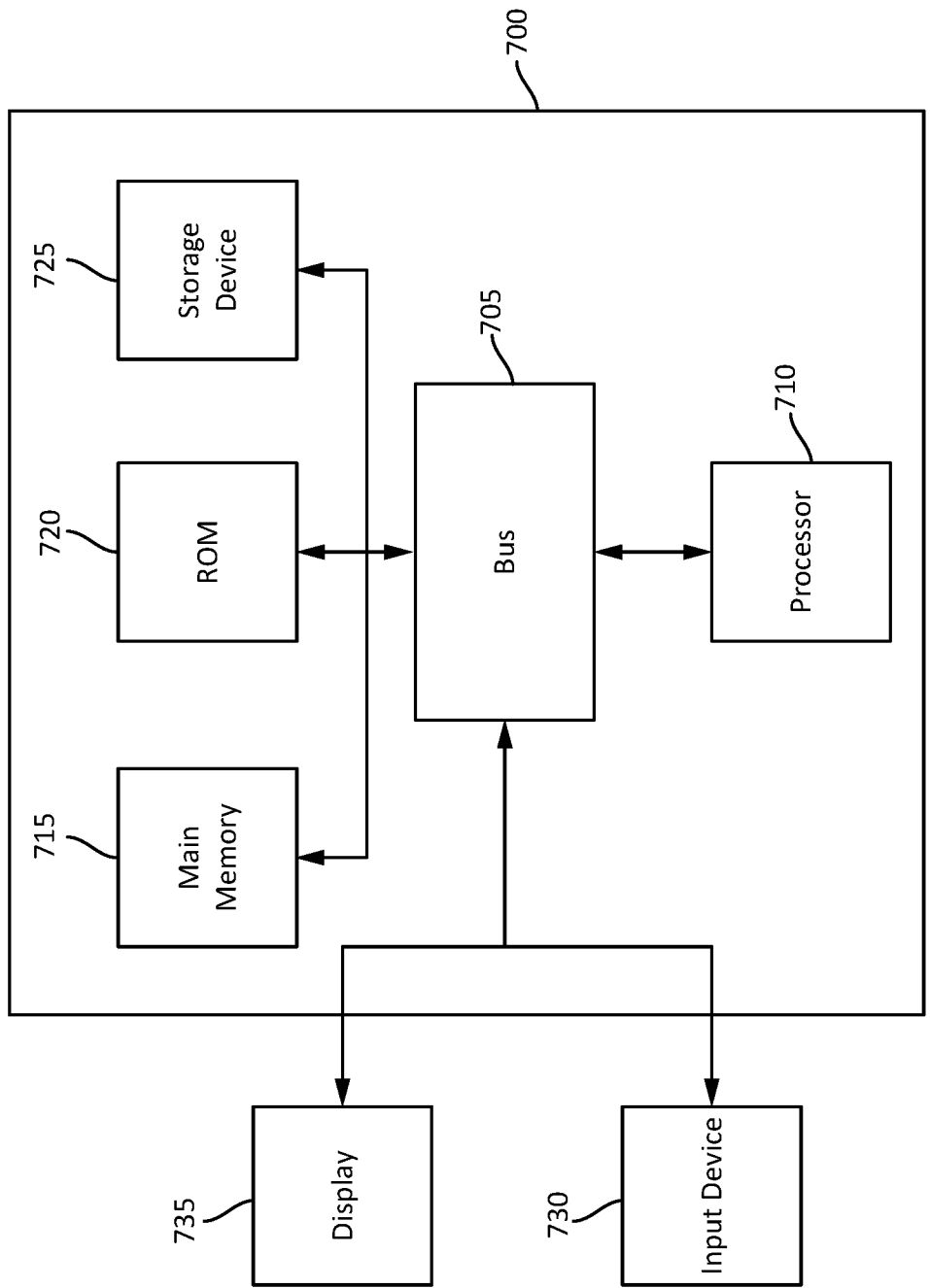
FIG. 7 is a block diagram illustrating an architecture for a computer system that can be employed to implement elements of the systems and methods described and illustrated herein, including, for example, the systems depicted in FIG. 1 and FIG. 2, and the methods depicted in FIG. 3, FIG. 4 and FIG. 5.

FIG. 4 depicts an example flow diagram of a method for function based electric vehicle geofencing. The method 400 can be performed by one or more systems or components depicted in FIG. 1. FIG. 2 or FIG. 7, including, for example, a data processing system 102 or vehicle 130. At ACT 402, the data processing system 102 can detect execution of a vehicle function 124. For example, the vehicle function 124 can include the vehicle functions 124 described herein, such as at ACT 302 of FIG. 3. At ACT 404, the data processing system 102 can identify a location of a vehicle 130. For example, the location of the vehicle 130 can be determined by the location module 104. At ACT 406, the data processing system 102 can determine that the location satisfies a geofence 116. Satisfaction of the geofence 116 can correspond to determining an intersection for a location point or area and a region defined by a geofence 116. For example, a distance from a centroid of a vehicle location can be compared to a radius 118 for a geofence 116, such that a distance which is less than the radius 118 satisfies the geofence 116.

At ACT 408, the data processing system 102 can perform an action 122 responsive to the determination of the satisfaction of the geofence 116. The action 122 can include a local action 122 which does not include communication with a server system 132 such as locking or unlocking doors, preconditioning a cabin to a desired temperature, or adjusting a desired charge level for a battery. The action 122 can include an action 122 which includes communication with a server system 132 such as a request for a software update, or an execution of a software update including an acknowledgment sent to the server, or a completion or state of a charging session. The communication can include or be based on a label 120 associated with a geofence 116. For example, the communication can include the label 120 or be generated based on a match or non-match of to one or more labels 120.

Figure 5:
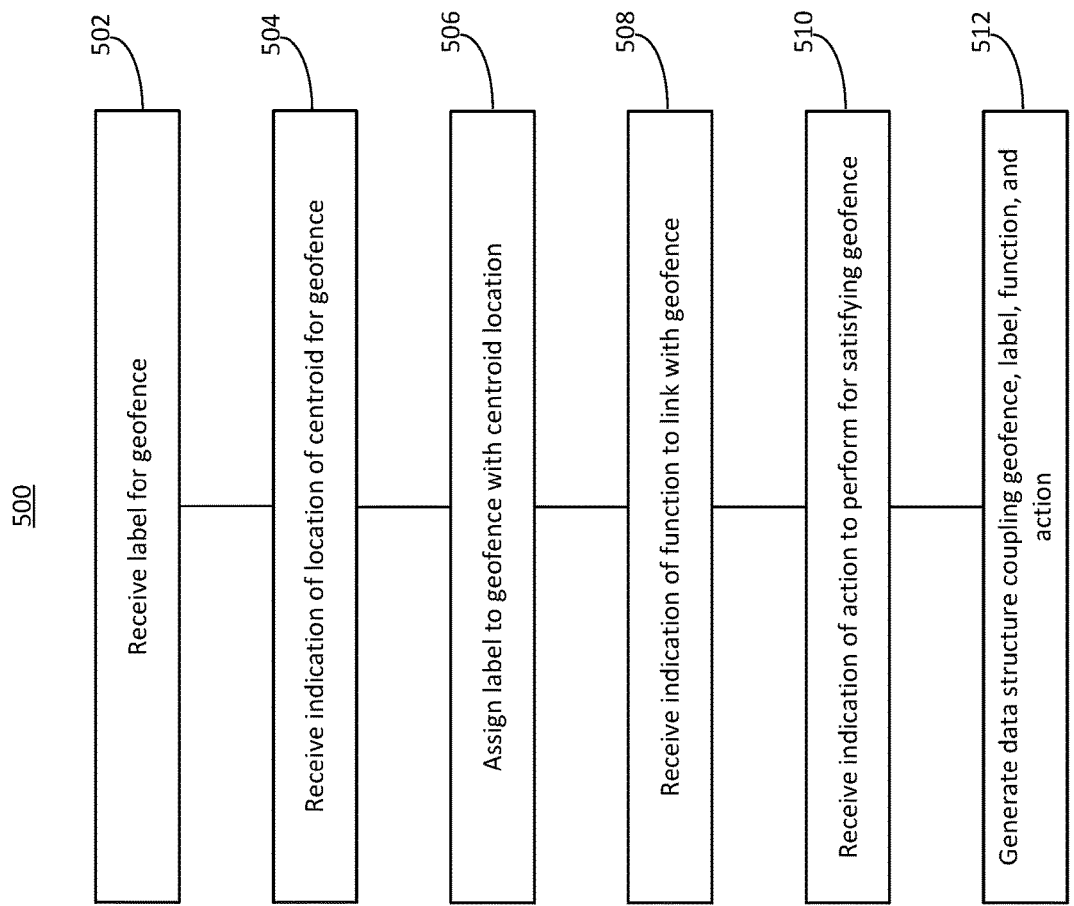
FIG. 5 depicts an example flow diagram of a method for function based electric vehicle geofencing.

FIG. 5 depicts an example flow diagram of a method for function based electric vehicle geofencing. The method 500 can be performed by one or more systems or components depicted in FIG. 1, FIG. 2 or FIG. 7, including, for example, a data processing system 102 or vehicle 130.

At ACT 502, the data processing system 102 can receive a label 120 for a geofence 116. The label 120 can be or include a default value such as "parking," "work," or "cabin." The data processing system 102 can receive the label 120 locally at the vehicle 130 (e.g., based on a user input through a user interface), or remote therefrom (e.g., from a server system 132). The label 120 can be one of various labels 120. For example, separate labels 120 can be received associated with a predetermined path, a parking location such as a home or office, or a charging location. One or more labels 120 can be associated with multiple locations. For example, a location associated with a charging network can include labels 120 corresponding to hundreds or thousands of charging locations, such that a label 120 can identify a vehicle 130 as in proximity of a charging station without disclosing a geographic location of a vehicle 130. For example, a vehicle 130 can include a same label 120 for a charging location in New York, Wyoming, or Ontario.

At ACT 504, the data processing system 102 can receive an indication of a location of a centroid for a geofence 116. For example, the data processing system 102 can receive an address or coordinates to form the center of a geofence 116. The data processing system 102 can receive the centroid locally at the vehicle 130 (e.g., based on a user input through a user interface), or remote therefrom (e.g., from a server system 132).

At ACT 506, the data processing system 102 can assign the label 120 to the geofence 116 with the centroid location. The data processing system 102 can assign a same label 120 to multiple centroid locations, or multiple labels 120 to a same centroid location. The data processing system 102 can assign the label 120 to the geofence 116 based on a user input or an absence of a user input. For example, the data processing system 102 can prompt a user to associate a label 120 with a location, confirm an association of a label 120 with a centroid, or include an interface for a user to remove, modify, or substitute an assignment of a label 120 with a geofence 116.

At ACT 508, the data processing system 102 can receive an indication of a function 124 to link with the geofence 116. The data processing system 102 can receive the function 124 from a predefined set of functions 124 locally stored on the vehicle 130, receive the function 124 from a server system 132, or from a user (e.g., from a user interface). The function 124 can include one or more constituent functions 124 such as a combination of a satisfaction of a geofence with an indication of a charging session or a detection of a key fob or mobile device.

At ACT 510, the data processing system 102 can receive an indication of an action 122 to perform for satisfying the geofence 116. The data processing system 102 can receive the action 122 from a predefined set of actions 122 locally stored on the vehicle 130, receive the action 122 from a server system 132, or from a user (e.g., from a user interface). The action 122 can include a conveyance of a notification which can include further information, such as to an occupant of the vehicle 130 or a server system 132. The action 122 can include a local storage of information, a deletion, modification or substitution of information prepared for conveyance, locking or unlocking a car, limiting energy available for propulsion, or adjusting a rate of charging.

At ACT 512, the data processing system 102 can generate a data structure coupling the geofence, label 120, function 124, and action 122. The data processing system 102 can store the data structure in memory of the data processing system 102 of the vehicle 130. For example, the data structure can be stored in various memories as depicted in FIG. 7, such as transitive or non-transitive memories.

Figure 6:
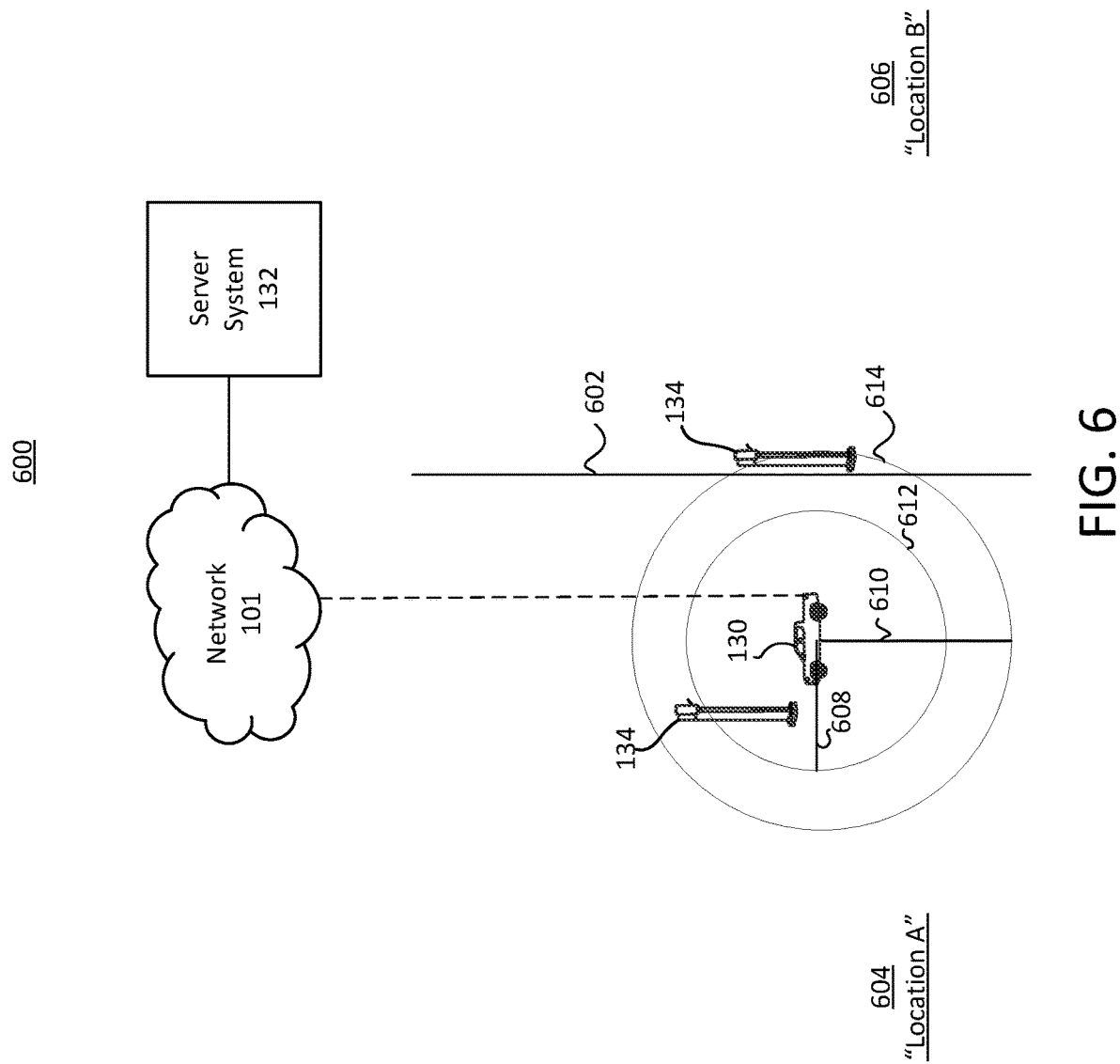
FIG. 6 is an example graphical depiction of a vehicle disposed along a geographical boundary.

FIG. 6 is a graphical depiction 600 of a vehicle 130 disposed along a geographic boundary 602 which can be associated with a first geofence 116. For example, the geographic boundary 602 can be or include a boundary between a municipal boundary such as a city, state, or national boundary. A data processing system 102 of the vehicle 130 can associate a label 120 with one or more depicted portions. For example, the data processing system 102 can associate a "Location A" label 120 with a first geofenced area 604, and a "Location B" label 120 with a second geofenced area 606. The data processing system 102 can determine a vehicle location, and determine whether the vehicle location is in the first geofenced area 604 or the second geofenced area 606. The vehicle 130 can be disposed at a predefined location which is a centroid for a geofence 116, or vehicle location can define a centroid.

The vehicle 130 can be in network communication with server system 132 over the network 101. The vehicle 130 can provide a label 120 associated with a vehicle location to the server system. For example, the vehicle 130 can provide an indication that the vehicle 130 is located within the first geofenced area 604. The server system 132 can convey an indication of a first radius 608 associated with the first geofenced area 604. For example, the server system 132 can convey a distance or reference to first radius 608 or can provide information to the vehicle to select the first radius 118 from a selection of various radii 118 stored locally on the vehicle 130. The first radius 608 can differ from a second radius 610 associated with the second geofenced area 606. A third geofenced area 612 can correspond to the first radius 608 such that an object, such as a charger 134, can be disposed within the third geofenced area 612. A further object such as another charger 134 can be disposed within a fourth geofenced area 614 defined by the second radius 610. The vehicle 130 can associate a label 120 with a location based on the various locations. For example, the vehicle can provide a label 120 associated with a charger 134 in the first geofenced area 604. Thus, the selection of a radius 118 (e.g., locally on the vehicle 130 or based on communication with the server) can determine an intersection between one or more geofenced areas, wherein the selection of a label 120 can vary according to the selection of the radius 118.

FIG. 7 is a block diagram illustrating an architecture for a computer system that can be employed to implement elements of the systems and methods described and illustrated herein, including, for example, the systems depicted in FIG. 1 and FIG. 2, and the methods depicted in FIG. 3, FIG. 4 and FIG. 5. The computing system 700 includes at least one bus 705 or other communication component for communicating information and at least one processor 710 or processing circuit coupled to the bus 705 for processing information. The computing system 700 can also include one or more processors 710 or processing circuits coupled to the bus for processing information. The computing system 700 also includes at least one main memory 715, such as a random access memory (RAM) or other dynamic storage device, coupled to the bus 705 for storing information, and instructions to be executed by the processor 710. The main memory 715 can be used for storing information during execution of instructions by the processor 710. The computing system 700 may further include at least one read only memory (ROM) 720 or other static storage device coupled to the bus 705 for storing static information and instructions for the processor 710. A storage device 725, such as a solid state device, magnetic disk or optical disk, can be coupled to the bus 705 to persistently store information and instructions.

The computing system 700 may be coupled via the bus 705 to a display 735, such as a liquid crystal display, or active matrix display, for displaying information to a user such as a driver of the electric vehicle 130 or other end user. An input device 730, such as a keyboard or voice interface may be coupled to the bus 705 for communicating information and commands to the processor 710. The input device 730 can include a touch screen display 735. The input device 730 can also include a cursor control, such as a mouse, a trackball, or cursor direction keys, for communicating direction information and command selections to the processor 710 and for controlling cursor movement on the display 735.

The processes, systems and methods described herein can be implemented by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. Hard-wired circuitry can be used in place of or in combination with software instructions together with the systems and methods described herein. Systems and methods described herein are not limited to any specific combination of hardware circuitry and software.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
    one or more processors, coupled with memory, of a vehicle to:
    detect execution of a function of the vehicle, the function comprising delivery of power via a power cable of a charger;
    identify, responsive to detection of the execution of the function, a first location of the vehicle;
    determine, responsive to execution of the function and based on a comparison of the first location of the vehicle with a geofence stored in memory of the vehicle, that the first location of the vehicle satisfies the geofence at the beginning of the delivery of power;
    identify a second location of the vehicle responsive to termination of the delivery of power via the power cable;
    determine that the second location satisfies the geofence;
    select an action corresponding to the execution of the function of the vehicle to perform, based on satisfaction of the geofence by both the first location and the second location; and
    perform, responsive to the determination that the first location and the second location of the vehicle satisfies the geofence stored in memory of the vehicle, the action.

2. The system of claim 1, comprising the one or more processors of the vehicle to:
    receive, via a user interface of the vehicle, a label for the geofence;
    assign the label to the geofence; and
    select the action to perform based on the label.

3. The system of claim 1, comprising:
    the one or more processors of the vehicle to establish a dynamic radius for the geofence stored in memory.

4. The system of claim 1, wherein the geofence comprises a radius, comprising:
    the one or more processors to set the radius for the geofence based on a type of the function.

5. The system of claim 1, wherein the geofence comprises a radius, comprising the one or more processors to:
    select, based on a lookup in a data repository, the radius for the geofence based on the first location of the vehicle; and
    set the radius for the geofence responsive to the selection.

6. The system of claim 1, wherein the geofence comprises a radius, comprising the one or more processors to:
    select, based on a lookup in a data repository, the radius for the geofence based on the first location of the vehicle and a type of the function; and
    set the radius for the geofence responsive to the selection.

7. The system of claim 1, wherein the function corresponds to a proximity locking function of the vehicle, comprising the one or more processors to:
    perform the action to disable the proximity locking function based on the vehicle within the geofence.

8. The system of claim 1, wherein the function corresponds to a software update of the vehicle, comprising the one or more processors to:
    perform the action to authorize the software update based on the vehicle within the geofence.

9. The system of claim 1, comprising the one or more processors to:
    detect a second execution of the function of the vehicle;
    identify, responsive to detection of the second execution of the function, a third location of the vehicle different from the first location;
    determine that the third location of the vehicle is outside the geofence; and
    perform, responsive to the determination that the third location of the vehicle is outside the geofence stored in memory of the vehicle, a second action corresponding to the execution of the function of the vehicle, the second action different from the action.

10. A method, comprising:
    detecting, by one or more processors coupled with memory of a vehicle, execution of a function of the vehicle, the function comprising delivery of power via a power cable of a charger;
    identifying, by the one or more processors responsive to detection of the execution of the function, a first location of the vehicle;
    determining, by the one or more processors, responsive to execution of the function and based on a comparison of the first location of the vehicle with a geofence stored in memory of the vehicle, that the first location of the vehicle satisfies the geofence at the beginning of the delivery of power;
    identify a second location of the vehicle responsive to termination of the delivery of power via the power cable;
    determine that the second location satisfies the geofence;
    select an action corresponding to the execution of the function of the vehicle to perform, based on satisfaction of the geofence by both the first location and the second location; and performing, by the one or more processors, responsive to the determination that the first location and the second location of the vehicle satisfies the geofence stored in memory of the vehicle, the action.

11. The method of claim 10, comprising:
receiving, by the one or more processors, via a user interface of the vehicle, a label for the geofence;
assigning, by the one or more processors, the label to the geofence; and
selecting, by the one or more processors, the action to perform based on the label.

12. The method of claim 10, comprising:
establishing, by the one or more processors, a dynamic radius for the geofence stored in memory.

13. The method of claim 10, wherein the geofence comprises a radius, comprising:
setting, by the one or more processors, the radius for the geofence based on a type of the function.

14. The method of claim 10, wherein the geofence comprises a radius, comprising:
selecting, by the one or more processors, based on a lookup in a data repository, the radius for the geofence based on the location of the vehicle; and
setting, by the one or more processors, the radius for the geofence responsive to the selection.

15. The method of claim 10, wherein the geofence comprises a radius, comprising:
selecting, by the one or more processors based on a lookup in a data repository, the radius for the geofence based on the location of the vehicle and a type of the function; and
setting, by the one or more processors, the radius for the geofence responsive to the selection.

16. The method of claim 10, wherein the function corresponds to a proximity locking function of the vehicle, comprising:
performing, by the one or more processors, the action to disable the proximity locking function based on the vehicle within the geofence.

17. A vehicle, comprising:
one or more processors, coupled with memory, to:
detect execution of a function of the vehicle, the function comprising delivery of power via a power cable of a charger;
identify, responsive to detection of the execution of the function, a first location of the vehicle;
determine, responsive to execution of the function and based on a comparison of the first location of the vehicle with a geofence stored in memory of the vehicle, that the first location of the vehicle satisfies the geofence at the beginning of the delivery of power;
identify a second location of the vehicle responsive to termination of the delivery of power via the power cable;
determine that the second location satisfies the geofence;
select an action corresponding to the execution of the function of the vehicle to perform, based on satisfaction of the geofence by both the first location and the second location; and
perform, responsive to the determination that the first location and the second location of the vehicle satisfies the geofence stored in memory of the vehicle, the action.

18. The vehicle of claim 17, comprising the one or more processors to:
receive, via a user interface of the vehicle, a label for the geofence;
assign the label to the geofence; and
select the action to perform based on the label.

* * * * *